Feb. 11, 1941. B. BERGHAUS ET AL 2,231,104

ELECTRIC REACTION FURNACE

Filed Dec. 15, 1938 3 Sheets-Sheet 1

B. Berghaus & W. Burkhardt
Inventors

By: Glascock Downing & Seebold
Attys.

Patented Feb. 11, 1941

2,231,104

UNITED STATES PATENT OFFICE 2,231,104

ELECTRIC REACTION FURNACE

Bernhard Berghaus, Berlin-Lankwitz, and Wilhelm Burkhardt, Berlin-Grunewald, Germany; said Burkhardt assignor to said Berghaus Application December 15, 1938, Serial No. 246,002
In Germany December 24, 1937

6 Claims. (Cl. 13—31)

The invention relates to a gas inlet and gas outlet for cathode disintegration apparatus of electrically heated vacuum, annealing and melting furnaces and of vacuum apparatus for carrying out chemical reactions, and includes means for holding back the discharge in the gas inlet or gas outlet.

The invention more particularly pertains to a sieve or filter provided in the gas inlet or gas outlet. The meshes of the sieve are so narrow that the glow discharge cannot break through into the gas inlet or gas outlet. The diameter of the sieve or the opening of the meshes depends upon the pressure of the filling gas, and on the current density of the discharge on the cathode. Preferably the sieve is provided with holes or meshes of less than three millimeters diameter, through which the glow discharge can no longer break through. A plurality of sieves may be arranged one behind the other so that their openings mutually cover one another. Instead of perforated sieves, use may be made of sieves consisting of a simple or multiple wire braiding.

By the present invention the advantage is attained that the gas discharge used for heating the material to be heated or fused or for carrying out the chemical reactions cannot break through into the gas inlet or gas outlet pipe.

Different forms of construction for carrying the invention into effect are illustrated diagrammatically and by way of example in the accompanying drawings in which.

Figure 3:
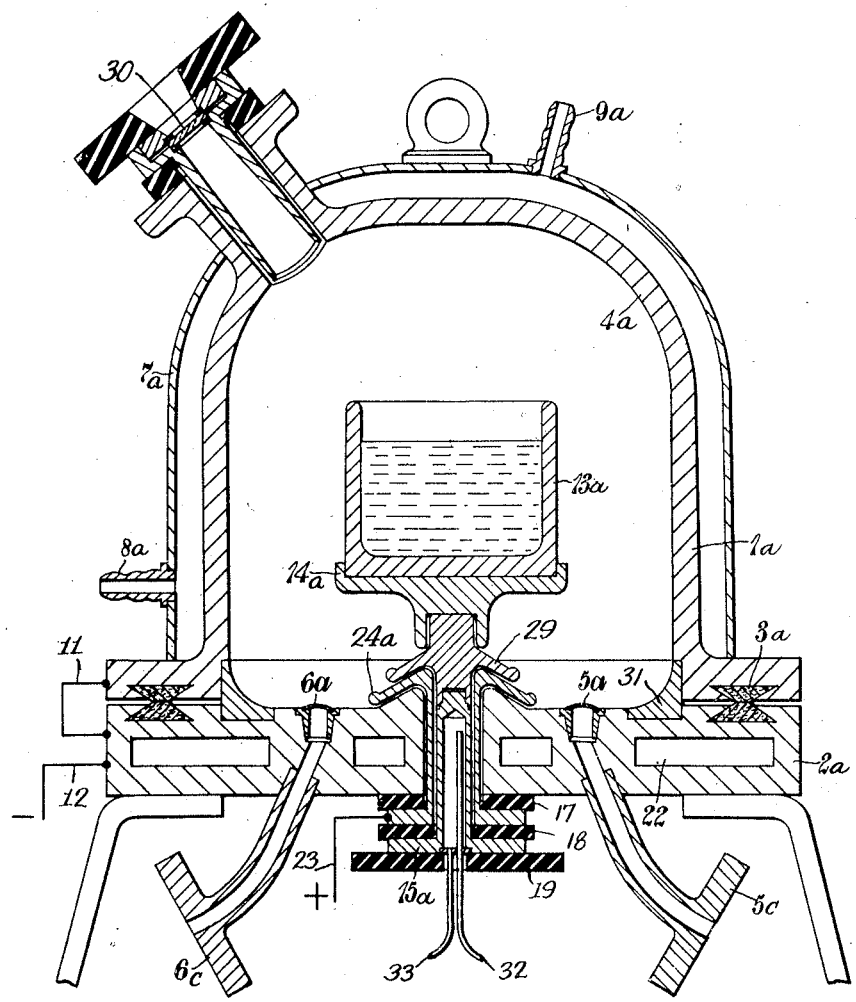
Figure 4:
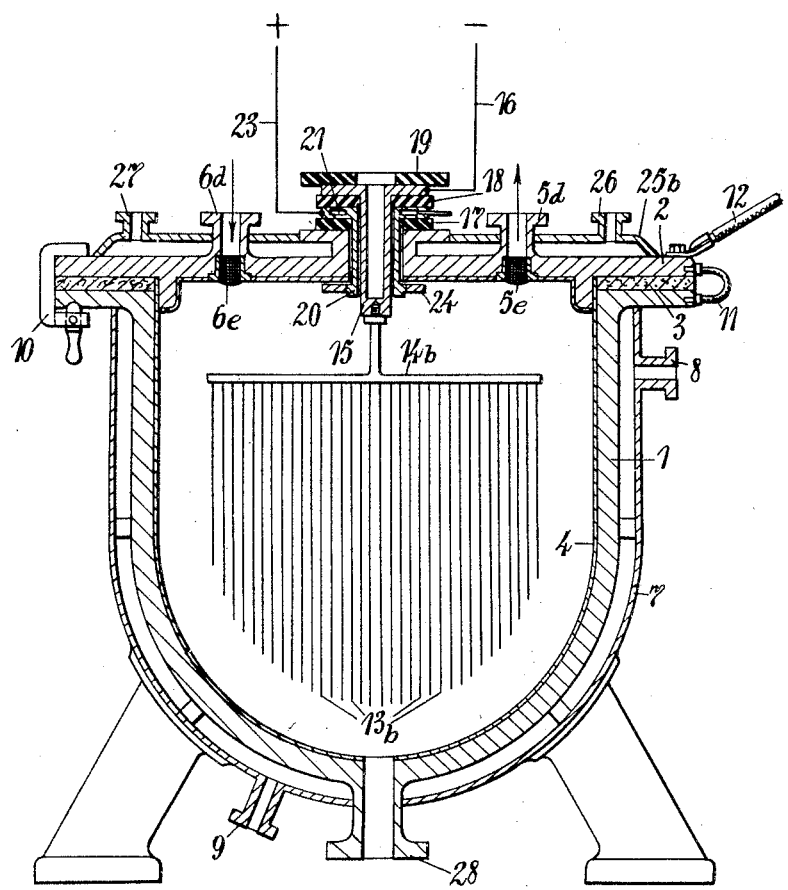

Figure 3 is a sectional elevation through an electrically heated vacuum, annealing and melting furnace in which the wall is connected as a cathode surrounding the articles to be heated and in which the gas inlet and gas outlet contain a sieve for keeping back the gas discharge used for heating up the material to be heated or fused; and Figure 4 is a sectional elevation through vacuum apparatus for carrying out the chemical reactions in which the wall of the apparatus is connected as a cathode and in which the gas inlet and gas outlet contain a sieve for keeping back the gas discharge used for carrying out the chemical reaction.

Figure 1:
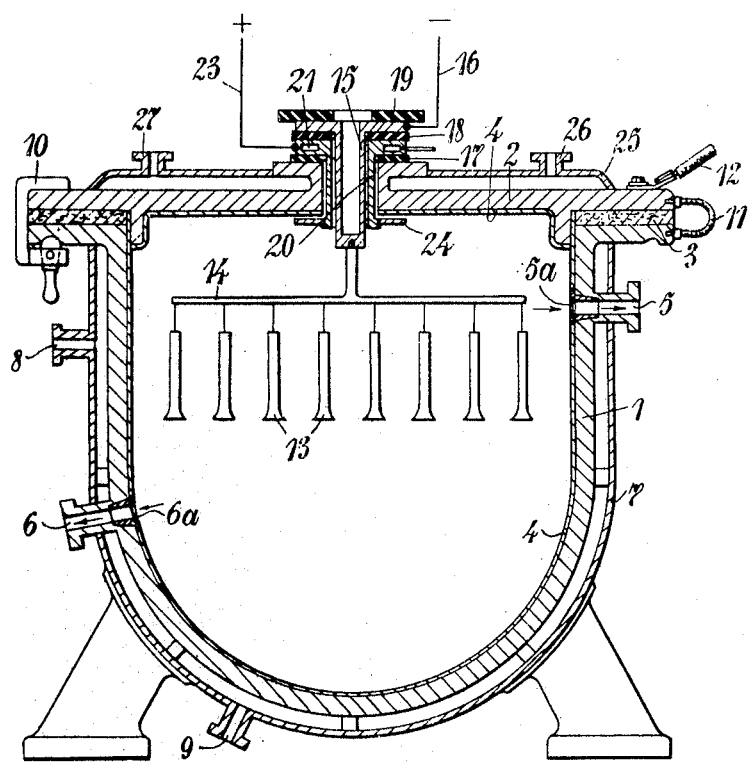
Figure 1 is a sectional elevation through a cathode disintegration apparatus in which the whole inner wall of the apparatus forms a cathode surrounding the articles to be coated and in which a sieve is provided in the gas inlet and gas outlet.

Referring to Figure 1 in which the whole of the inner surface of the cathode disintegration chamber is constructed as a cathode surrounding the articles to be coated, 1 is the cathode disintegration vessel which is provided with a cover 2 closed in a vacuum-tight manner through the intermediary of an air-tight packing 3. The whole internal surface of the apparatus, both the vessel and the cover, is coated with the material 4 to be disintegrated, which may consist of any desired metal, a metal alloy or a metalloid. The vacuum pump, which is not shown, is connected to the pipe connection 5 while the pipe connection 6 is used for the introduction of a neutral reducing gas such as hydrogen, nitrogen or the like. The vessel is surrounded by a cooling jacket 7 to which a medium, for instance water or oil, may be supplied through the pipe connection 8. The cooling medium is discharged through the pipe connection 9. The cover is secured to the vessel by means of clamps 10 and may be directly connected to the vessel by means of the removable connector 11. The negative voltage is applied by means of the cable 12 secured to the cover.

The articles 13 to be coated are, for instance, suspended from a frame 14 secured to the current lead-in 15, the latter being connected by means of the cable 16 to the negative pole of the direct current voltage. 17, 18 and 19 are rings of insulating and air-tight packing material and 20 is a metallic screening sleeve, the hollow flange 21 of which may be cooled is clamped on to the cover by means of screws (not shown). The positive voltage is applied to the screening sleeve by the cable 23. The screening sleeve may support at its end an anode 24 which may be in the shape of a plate.

Also the cover of the vessel is provided with a jacket 25, to which a cooling medium may be supplied through the pipe connection 26, being discharged therefrom through the pipe connection 27. According to the invention, a sieve 6a is provided in the gas inlet and likewise a sieve 5a is provided in the gas outlet 5, which sieves prevent the glow discharge from breaking through into the gas inlet or gas outlet. The mesh of the sieve is less than one millimeter.

Figure 2:
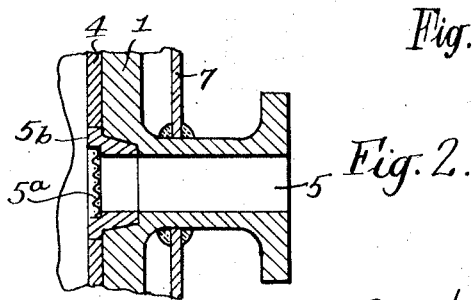
Figure 2 is a section through the gas inlet (or outlet) according to Figure 1, on an enlarged scale.

Figure 2 shows the pipe connection 5 with the sieve 5a on an enlarged scale. The sieve is mounted in a removable sleeve 5b.

Referring to Figure 3, which illustrates in section an electrically heated vacuum, annealing and melting furnace in which the wall is formed as a cathode surrounding the articles to be heated and the removable vessel 1a of the furnace is connected to a base 2a in a vacuum-tight manner through the interposition, for instance, of an air-tight packing rings 3a. The whole inner surface 4a of the furnace may be coated with a suitable material, preferably one which easily emits electrons, for instance aluminium, magnesium or light metal. The vacuum pump (not shown) is connected to the pipe connection 5c while the pipe connection 6c serves for the supply of a neutral or reducing gas, such as nitrogen, hydrogen, rare gases or the like. According to the invention, the sieve 6a is mounted in the gas inlet 6c and, likewise, the sieve 5a in the gas outlet 5c, which sieves prevent the gas discharge, more particularly glow discharge, from striking into the gas inlet or gas outlet pipe. The mesh of the sieve is, for instance, smaller than one millimeter. The vessel of the furnace is surrounded by a jacket 7a to which the cooling medium such as water, oil or even air is supplied through the pipe connection 8a. The cooling means is discharged through the pipe connection 9a. The base may be conductively connected to the vessel of the furnace by the removable connector 11. The negative voltage is applied by the cable 12, which is secured to the base.

The material to be heated or fused is placed, for instance, in a crucible 13a which rests on a metallic or insulating plate 14a carried by the cooled current lead-in 15a through the intermediary of a metal or insulating member 29. An anode 24a is insulated and screened with respect to the base 2a and the lead-in 15a by a narrow gap and is connected by the cable 23 to the positive pole of a source of direct current voltage. The rings for insulating and sealing the lead-in assembly are indicated at 17, 18 and 19. By means of screws, which for the sake of clearness are not shown, the ring 19 is clamped on to the base. The gas discharge for the heating of the material to be annealed or fused is produced between the anode 24a and the wall of the furnace, which is connected as a cathode, the gas discharge taking place at a pressure between 40 and 0.001, preferably about 5 to 0.1 millimeters of mercury.

The furnace is also provided with an inspection window 30 which is inserted in a screened manner. A ring 31 is arranged for covering the gap between the metal housing and the base. The pipe connection 32 serves for the supply of the cooling medium to the lead-in 15a, while a pipe 33 is provided for the discharge of the cooling medium. The base is provided with passages 22 for receiving the cooling medium.

Referring to Figure 4 showing a section through apparatus for carrying out chemical reactions and in which the wall is constructed as a cathode, 1 is the reaction vessel provided with a cover 2 closed in a vacuum-tight manner by means of a packing 3. The whole of the inner surface of the reaction apparatus, that is to say of the cover and vessel, is coated with a suitable electrode material 4, which may consist of any desired metal, metal alloy or metalloid. Use may be made of copper, iron, aluminium, light metals and the like. The vacuum pump (not shown) is connected to the pipe connection 5d in the cover while the pipe connection 6d serves for the supply of the reaction constituents. The reaction vessel is surrounded by a jacket 7 to which a cooling medium such as water, oil or even air may be supplied through the pipe connection 8. The cooling medium is discharged through the pipe connection 9. The cover is secured to the vessel by clamps 10 and may be conductively connected to the vessel by the removable connector 11. The negative voltage is supplied through the cable 12 secured to the cover. When use is made of catalysts 13b, these are suspended, for instance, in a frame 14b secured to the current lead-in 15 and may be connected by the cable 16, for instance, to the negative pole of a source of direct current voltage. The connection of the catalysts to the source of direct current voltage may also be interrupted, the catalysts being then suspended in the reaction vessel in a neutral manner. 17, 18 and 19 are rings of insulating and packing material and 20 is the metallic screening sleeve, the hollow flange 21 of which may be cooled by a cooling medium and be clamped on to the cover by screws (not shown). The positive voltage is applied to the screening sleeve by the cable 23. The screening sleeve may support at its end an anode 24 which may be in the form of a plate. Between the anode 24 and the wall covering material 4 of the reaction vessel, connected as a cathode, a gas discharge takes place, as required for carrying out the chemical reaction at a pressure between 40 and 0.001 preferably between about 5 and 0.1 millimeters of mercury.

Also the cover of the vessel is provided with a jacket 25b, to which the cooling medium is supplied through the pipe connection 26, being discharged through the pipe connection 27. According to the invention, a sieve 6e is mounted in the gas inlet 6d and a sieve 5e in the gas outlet 5d, which sieves prevent the gas discharge, more particularly glow discharge, from breaking through into the gas inlet and gas outlet respectively. The mesh of the sieve is for instance smaller than one millimeter. Liquid reaction products which may be produced are discharged through the pipe connection 28.

While the invention has been described with reference to specific structural details it is apparent that changes may be made therein. Such changes may be made without departing from the spirit and scope of the invention as set forth in the appended claims. It is to be further understood that the expression "electrical reaction furnace" as used herein relates to cathode disintegration apparatus, electrically heated vacuum, annealing and melting furnaces heated electrically by means of a glow discharge and vacuum apparatus for carrying out chemical reactions by a gas or glow discharge.

We claim:

1. In an electrical reaction furnace, a separable sealed housing adapted to be evacuated, means for introducing a gaseous medium into said housing, means for creating a glow discharge within said housing, and a screen extending across said first mentioned means for preventing the glow discharge from extending into said introducing means.

2. In an electrical reaction furnace, a separable sealed housing adapted to be evacuated, a pipe for introducing a gaseous medium into said housing, means for creating a glow discharge within the housing, and a screen extending across said pipe flush with the inner surface of the housing for preventing the glow discharge from extending into said pipe from within the housing.

3. In an electrical reaction furnace, a separable sealed housing adapted to be evacuated and enclose articles to be treated, a pipe for introducing a gaseous medium into said housing, a tube for withdrawing the gaseous medium from within said housing, means for creating a glow discharge within said housing, a metal screen extending across said pipe for preventing the glow discharge from extending into said pipe, and a metal screen extending across said tube for preventing the glow discharge from extending into said tube.

4. In an electrical reaction furnace, a separable sealed housing adapted to be evacuated and enclose articles to be treated, a pipe for introducing a gaseous medium into said housing, a tube for withdrawing the gaseous medium from within said housing, means for creating a glow discharge within said housing, a metal apertured member extending across said pipe for preventing the glow discharge from extending into said pipe, and another metal apertured member extending across said tube for preventing the glow discharge from extending into said tube.

5. In an electrical reaction furnace, a separable sealed housing adapted to be evacuated and enclose articles to be treated, said housing having an inlet and an outlet for a gaseous medium, means for creating a glow discharge within said housing, a sieve arranged in said inlet, a sieve arranged in said outlet, said sieves preventing said glow discharge from extending outwardly of the housing through the inlet and the outlet.

6. In an electrical reaction furnace, a separable sealed housing adapted to be evacuated and enclose articles to be treated, said housing having an inlet and an outlet for a gaseous medium, means for creating a glow discharge within said housing, means having apertures therein covering said inlet and said outlet for preventing said glow discharge from extending outwardly of the housing through the inlet and the outlet.

BERNHARD BERGHAUS.
WILHELM BURKHARDT.